United States Patent [19]

Seipp

[11] 4,075,867
[45] Feb. 28, 1978

[54] COMPACT REFRIGERATION UNIT

[75] Inventor: Ronald W. Seipp, Apple Valley, Minn.

[73] Assignee: Thermo King Corporation, Minneapolis, Minn.

[21] Appl. No.: 755,771

[22] Filed: Dec. 30, 1976

[51] Int. Cl.² .................. F25B 27/00; B60H 3/04
[52] U.S. Cl. ............................. 62/323; 62/236; 62/239
[58] Field of Search ............ 62/298, 262, 263, 323, 62/419, 228, 236, 239; 192/105 CD

[56] References Cited

U.S. PATENT DOCUMENTS

| | | | |
|---|---|---|---|
| 2,962,873 | 12/1960 | Anderson | 62/323 |
| 3,052,103 | 9/1962 | Clark, Jr. | 62/323 |
| 3,512,373 | 5/1970 | White | 62/323 |
| 3,545,222 | 12/1970 | Petranek | 62/323 |
| 3,646,773 | 3/1972 | Falk et al. | 62/323 |
| 3,841,108 | 10/1974 | Pierrat | 62/323 |
| 3,871,188 | 3/1975 | Vold et al. | 62/323 |

Primary Examiner—Lloyd L. King
Attorney, Agent, or Firm—F. E. Blake; C. F. Renz

[57] ABSTRACT

A compact refrigeration unit supported by a generally rectilinear frame structure with front and back frame members having their axial planes spaced apart along the long axis of the frame is provided with a first selectively energized prime mover positioned within the frame with its relatively long rotary drive shaft in alignment with the long axis of the frame and a second selectively energized prime mover positioned within the frame with its relatively short rotary drive shaft extending from front to back frame member planes at right angles to the shaft of said first prime mover, there being clutch means to connect said first prime mover to a refrigerant compressor within said frame to drive said compressor when said first prime mover is energized and said clutch is engaged and there being right angle drive means including flexible connections to connect said compressor and said second prime mover to drive said compressor when said second prime mover is energized and said first prime mover is deenergized with said clutch disengaged.

6 Claims, 2 Drawing Figures

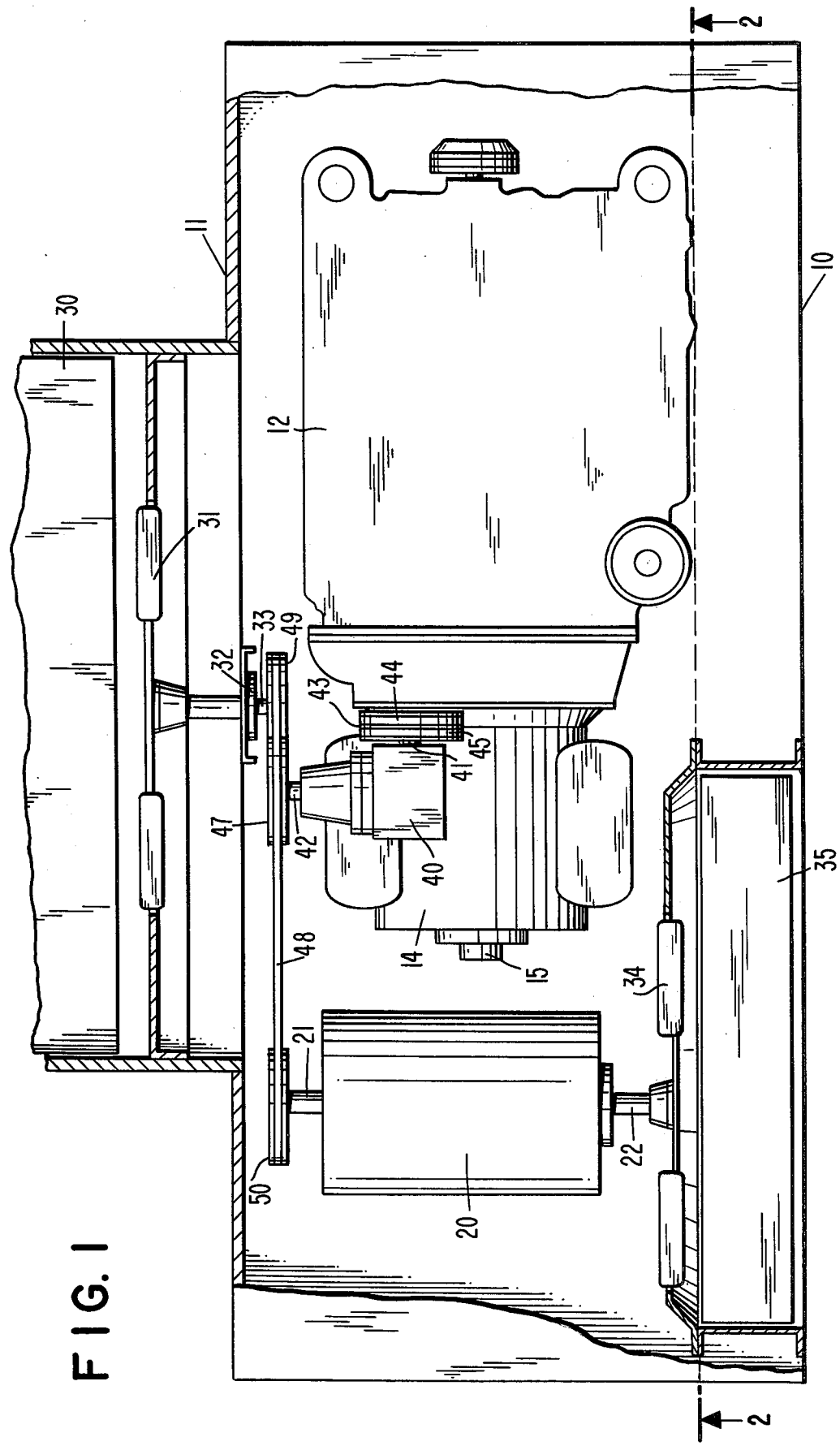
FIG. I

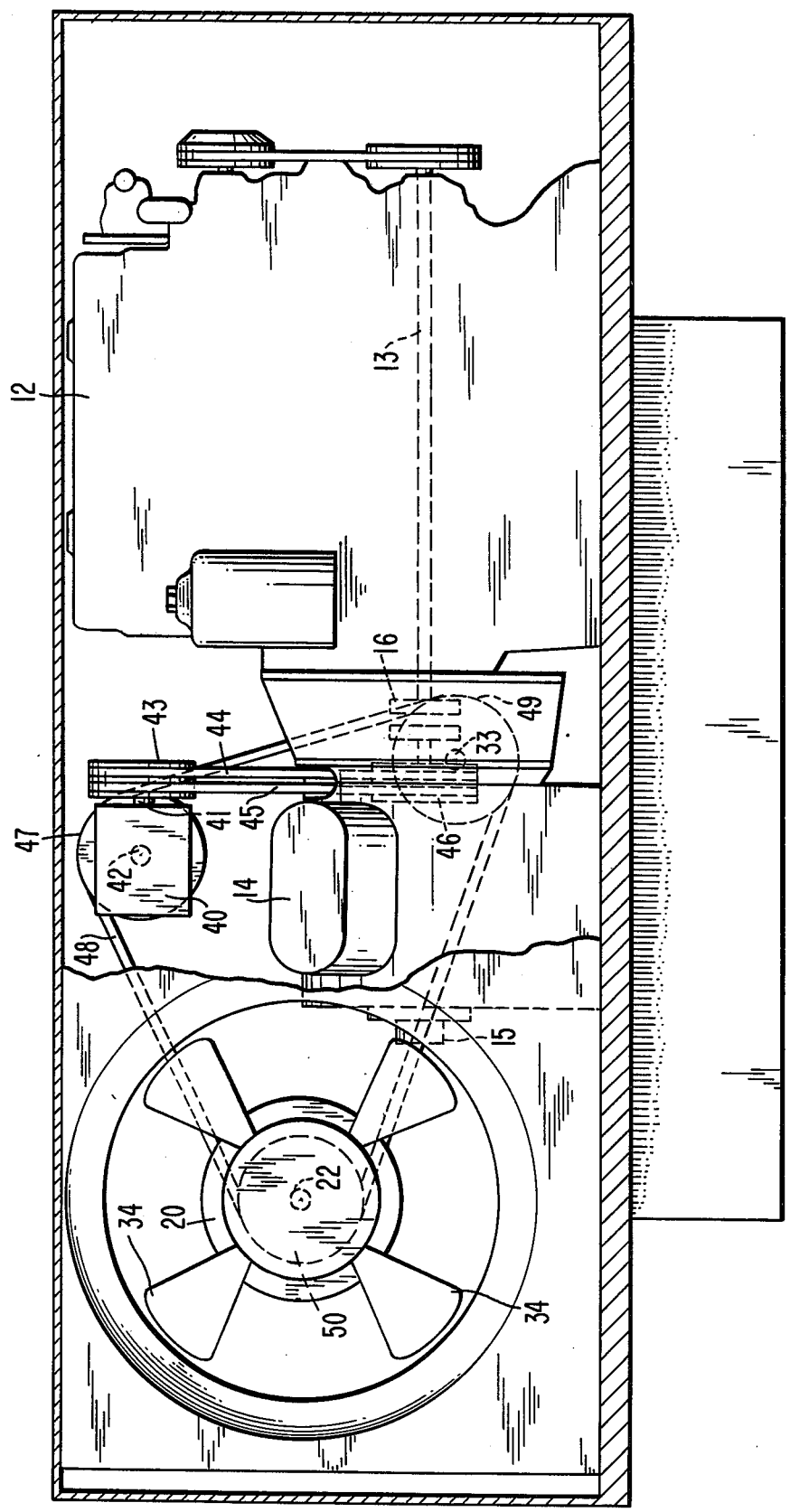

COMPACT REFRIGERATION UNIT

BACKGROUND OF THE INVENTION

It is known to provide transportation refrigeration units with two selectively energized rotary shaft prime mover power plants to drive its refrigerant compressor and the fans for the refrigerant evaporating and condensing coils. Usually the first prime mover is an internal combustion engine having a relatively long drive shaft for powering the unit when it is on the move and the second prime mover is an electric motor having a relatively short drive shaft for powering the unit when a source of electric power is available and the unit is stationary on a boat or at a loading dock or the like. It is of course desirable to construct the refrigeration unit in as compact a package as possible and it is the principal object of this invention to provide a compact refrigeration unit containing the two aforementioned selectively energizable prime mover power plants.

STATE OF THE PRIOR ART

The U.S. Pat. No. 3,871,188 to Vold and Taylor discloses a frame arrangement for a transportation refrigeration unit and the U.S. Pat. No. 3,512,373 discloses a transportation refrigeration unit having two selectively energized prime mover sources of rotary power such as an electric motor and an internal combustion engine. Neither of the aforementioned patents discloses the arrangement of the subject invention having a right angle drive transmission interconnecting a long axis internal combustion engine prime mover to an aligned compressor shaft and a short axis electric motor at right angles to the axis of the compressor shaft and first prime mover as contained in a compact generally rectilinear frame structure.

SUMMARY OF THE INVENTION

In accordance with the invention a compact transportation refrigeration unit is contained within a generally rectilinear frame structure. The front frame members are aligned in one plane spaced apart from the rear frame members aligned in a second plane with both planes aligned along the long axis of the rectilinear frame. A refrigerant condensing coil is supported in alignment with the plane of the front frame members and a refrigerant evaporator coil is supported in general alignment with the plane of the rear frame members. Supported within the rectilinear frame member with its drive shaft extending along the long axis of the frame is a first relatively long prime mover power source such as an internal combustion engine. A refrigerant compressor is also positioned within the frame with its drive shaft aligned with the first prime mover drive shaft and connectable thereto through suitable clutch means. A second prime mover having a relatively short drive shaft such as an electric motor or the like is positioned within the frame with its shaft extending between the axial planes of the front and back frame members at right angles to the long axis of the rectilinear frame. A right angle drive transmission is supported within the frame over the compressor with one of its drive shafts aligned in a plane parallel to the compressor drive shaft and the other of its drive shafts extending at right angles between the planes of the front and back frame members. Flexible drive means, such as pulleys and belts interconnect the first drive shaft of the right angle transmission to the drive shaft of the compressor. Other flexible drive means, such as pulleys and belts interconnect the second drive shaft of the transmission to the drive shaft of the second prime mover. In the preferred form of the invention the drive pulley is secured to one end of the electric motor prime mover shaft and a condensing coil fan is secured to the other end of the electric motor drive shaft. In addition, an evaporator coil fan may be supported with its drive shaft extending within the rectilinear frame at right angles to the axial plane of the rear frame members and a drive pulley may be mounted on such fan drive shaft to be driven by the belt interconnecting the electric motor and the second drive shaft of the right angle drive transmission. Thus as described above a compact arrangement of a first long axis prime mover and a second short axis prime mover is provided within a generally rectilinear frame structure and the refrigerant compressor and fans will be powered by the first prime mover when it is energized and the clutch is engaged. The refrigerant compressor and fans may be driven by the second prime mover when only it is energized and the clutch is disengaged. Since the second prime mover is an electric motor, its armature may be rotated by the first prime mover when the first prime mover only is energized with the clutch engaged and, if desired, the electric motor may be wired to function as a generator when so driven.

Other features and advantages of the invention will be apparent with references to the following detailed description and drawings.

BRIEF DESCRIPTION OF THE DRAWINGS

FIG. 1 is a top plan view partly broken away in section to show the general component layout of the compact refrigeration unit of the invention; and FIG. 2 is a front elevational view partly broken away and in section along the line 2—2 of FIG. 1.

DESCRIPTION OF THE PREFERRED EMBODIMENT

Referring to the drawings, the compact refrigeration unit of the invention is carried on a generally rectilinear frame structure having front frame members axially aligned in a front plane 10 and back frame members axially aligned in a back plane 11 parallel to the front plane 10 and spaced apart therefrom along the long axis of the frame. The details of the frame members are not shown in order to provide more clarity in the drawings for the inventive features to be described. A relatively long axis first prime mover such as an internal combustion engine or the like is shown at 12 and is arranged to be selectively energized. The internal combustion engine 12 is positioned within the frame such that its crank shaft or output drive shaft 13 is in alignment with the long axis of the frame. Similarly, the refrigerant compressor 14 is positioned within the frame with its drive shaft 15 in alignment with drive shaft 13 of the first prime mover 12. A suitable clutch 16 shown by dotted outline only in FIG. 2 of the drawings is provided to enable the first prime mover 12 when energized to drive the compressor 14 when the clutch 16 is engaged and this clutch may be controlled centrifugally to be automatically engaged whenever the first prime mover 12 is energized to operate. The details of the clutch are not part of this invention and any suitable clutch structure known to those skilled in the art may be used.

A second prime mover 20, such as an electric motor, is provided to alternately power the refrigeration unit when it is energized and the first prime mover 12 is not energized with the clutch 16 disengaged. The electric motor 20, having a relatively short drive shaft is positioned with the axis of its drive shaft and armature extending between the front and back planes of the frame members at right angles to the long axis of the frame and the respective axial alignments of the compressor shaft 15 and the first prime mover shaft 13. One end of the electric motor 20 armature shaft extends at 21 adjacent to the rear member plane 11 and the other end at 22 adjacent the front frame member plane 10.

A refrigerant evaporator coil 30 is secured near the plane 11 of the rear frame members and parallel thereto. An evaporator fan 31 is journaled at 32 on the rear frame structure and has a fan shaft 33 extending within the frame on an axis at right angles to the rear frame plane 11. A condensing coil fan 34 is secured to the shaft end 22 of the electric motor adjacent to the refrigerant condensing coil 35 that is supported in general alignment with the plane 10 of the front frame members.

A right angle drive transmission 40 is supported within the frame structure with a first drive shaft 41 aligned parallel to the compressor drive shaft 15 and with a second drive shaft 42 extending at right angles thereto between the front plane 10 and back plane 11 of the frame members. The preferred arrangement for supporting the right angle drive transmission 40 is to mount it over the compressor 14 and the supporting frame structure for the right angle drive transmission 40 has been omitted from the drawings for the purpose of clarity. A double sheaved pulley 43 is mounted on the drive shaft 41 and is connected by belts 44 and 45 to a double sheaved pulley 46 secured to the drive shaft 15 of the compressor 14. A single sheave pulley 47 is connected to the drive shaft 42 and a drive belt 48 interconnects the pulley 47 with the evaporator fan shaft pulley 49 and the electric motor pulley 50.

When the refrigeration unit of the invention is carried by a body to be refrigerated which is on the move, such as a truck body on a highway, there is usually no source of electric power available and the internal combustion engine 12 will be energized with the clutch 16 engaged to drive the compressor shaft 15. At the same time the belts 44 and 45 connecting the compressor drive shaft to the right angle transmission 42 will cause the fan shaft 33 to be rotatably driven along with the armature of the electric motor 20 and its shaft ends 21 and 22 to the evaporator coil fan 34. At other times when a source of electric power is available, the internal combustion engine 12 will be de-energized and the clutch 16 disengaged. At the same time the electric motor prime mover 20 will be energized to rotate its evaporator fan 34 and drive pulley 50 and thereby through the pulley belt 48 drive the condensor fan 31 and right angle drive transmission 40. Since the right angle drive transmission 40 is interconnected to the compressor 14 through the belts 44 and 45 the energized electric motor 20 also powers the refrigerant compressor 14.

It should be understood that the exact relative positions of the first prime mover 12 and the second prime mover 20 within the frame structure may be varied somewhat so long as the general arrangement of the right angle drive mechanism is maintained relative thereto in a manner to provide the compact mechanical layout as described. Although specific forms of prime movers have been mentioned, it should be understood that the arrangement of the invention may be used with any specific types of prime movers where the first prime mover is a relatively long axial device and the second prime mover is a relatively short axial device. Thus the concept of this invention is the use of the right angle drive transmission enabling the positioning of the long axis prime mover within the frame with its long axis in alignment with the long axis of the frame and the positioning of the short axis prime mover with its axis extending at right angles to the long axis of the frame.

Various modifications will occur to those skilled in the art.

What is claimed is:

1. A compact refrigeration unit comprising, a generally rectilinear frame structure having front and back frame members with their axial planes spaced apart parallel to the long axis of the frame, a first selectively energizable prime mover having a relatively long rotary shaft and positioned along the long axis between said front and back frame members, a second selectively energizable rotary prime mover having a relatively short rotary shaft and positioned between said front and back frame members with its shaft extending from front to back frame member planes at right angles to the long axis of said frame, a refrigerant compressor positioned between said frame members and having a rotary drive shaft in alignment with the shaft of said first prime mover, clutch means to selectively connect the shaft of said first prime mover to the shaft of said compressor, a right angle drive transmission mounted within said frame over said compressor with a first drive shaft in generally axial alignment with said compressor shaft and a second drive shaft extending from front to back frame member planes at right angles to the long axis of said frame, flexible drive means interconnecting said first drive shaft of said transmission and the shaft of said compressor, and flexible drive means interconnecting the shaft of said second prime mover to the second drive shaft of said right angle drive transmission whereby said first prime mover may be energized to drive said compressor with said clutch engaged and said second prime mover may be energized to drive said compressor when said clutch is disengaged.

2. The invention of claim 1 in which the length of the first prime mover and its drive shaft along its drive shaft axis is greater than the spacing between the axial planes of the front and back frame members and the length of the second prime mover and its drive shaft along its drive shaft axis is less than the spacing between the axial planes of the front and back frame members.

3. The invention of claim 2 in which said first prime mover is an internal combustion engine and said second prime mover is an electric motor.

4. The invention of claim 3 in which the first and second flexible drive means are pulley and belt arrangements.

5. The invention of claim 1 in which the first and second flexible drive means are pulley and belt arrangements.

6. A compact refrigeration unit comprising, a generally rectilinear frame structure having front and back frame members with their axial planes spaced apart parallel to the long axis of the frame, a refrigerant condensing coil positioned in general alignment with said front frame members, a refrigerant evaporating coil positioned in general alignment with said back frame members, a first selectively energizable prime mover having a relatively long rotary shaft and positioned along the long axis between said front and back frame members, a second selectively energizable rotary prime mover having a relatively short rotary shaft extending from each end and positioned between said front and back frame members with its shaft extending from front to back frame member planes at right angles to the long axis of said frame and near said condensing coil, a refrigerant compressor positioned between said frame members and having a rotary drive shaft in alignment with the shaft of said first prime mover, a condensing coil fan secured to one end of the shaft of said second prime mover adjacent said condensing coil, clutch means to selectively connect the shaft of said first prime mover to the shaft of said compressor, an evaporating coil fan positioned adjacent said evaporator coil and having a fan shaft extending within said frame from front to back frame member planes at right angles to the long axis of said frame, a right angle drive transmission mounted within said frame over said compressor with a first drive shaft in generally axial alignment with said compressor shaft and a second drive shaft aligned perpendicular to the long axis of said frame from front to back frame member planes, flexible drive means interconnecting said first drive shaft of said transmission and the shaft of said compressor, and flexible drive means interconnecting the other end of the shaft of said second prime mover to the evaporating coil fan shaft and to the second drive shaft of said right angle drive transmission whereby said first prime mover may be energized to drive said compressor and said fans with said clutch engaged and said second prime mover may be energized to drive said compressor and said fans when said clutch is disengaged.

* * * * *